(12) United States Patent
Drucker (10) Patent No.: US 8,096,350 B2
(45) Date of Patent: Jan. 17, 2012

(54) DUAL POINT ADJUSTABLE DEPTH AIR SPARGING WELL SYSTEM

(75) Inventor: Andrew S. Drucker, Newbury Park, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 450 days.

(21) Appl. No.: 12/235,961

(22) Filed: Sep. 23, 2008

(65) Prior Publication Data

US 2009/0014167 A1 Jan. 15, 2009

Related U.S. Application Data

(63) Continuation-in-part of application No. 11/527,659, filed on Sep. 21, 2006, now abandoned.

(51) Int. Cl.
*E21B 33/00* (2006.01)

(52) U.S. Cl. .......... 166/67; 166/387; 166/311; 166/188; 166/370; 405/128.15; 405/128.45; 405/128.7

(58) Field of Classification Search .................. 166/387, 166/311, 188, 242.1, 267, 67, 263, 268, 370; 405/128.25, 128.15, 128.45, 128.5, 128.7, 405/128.75
See application file for complete search history.

(56) References Cited

U.S. PATENT DOCUMENTS 5,879,108 A * 3/1999 Haddad .................. 405/128.45
6,305,878 B1 * 10/2001 Drucker .................. 405/128.25
7,828,495 B2 * 11/2010 Drucker .................... 405/128.5

OTHER PUBLICATIONS http://www.thefreedictionary.com/strapping.*

* cited by examiner

*Primary Examiner* — Kenneth L Thompson
*Assistant Examiner* — Sean Andrish
(74) *Attorney, Agent, or Firm* — David Kalmbaugh; Chris Blackburn (57) ABSTRACT

An adjustable depth air sparging well system having a fixed depth or secondary air injection point and an adjustable depth or primary air injection point for injecting compressed air into saturated or groundwater regions of the soil's subsurface to remove volatile contaminants from the soil's subsurface. At least one flow-through air sparge packer which is slidably mounted within the well casing of the air sparging well system allows a user to adjust the depth at which the adjustable depth air injection point is set. The flow through air sparge packer is available in one, two and one half and five foot lengths.

20 Claims, 6 Drawing Sheets

DUAL POINT ADJUSTABLE DEPTH AIR SPARGING WELL SYSTEM

This application is a continuation-in-part of U.S. patent application Ser. No. 11/527,659, filed Sep. 21, 2006 now abandoned.

BACKGROUND OF THE INVENTION

1. Field of the Invention

The present invention relates generally to a system for removing environmentally harmful volatile contaminants from saturated or groundwater regions of the soil subsurface. More particularly, the present invention relates to a dual point adjustable depth air sparging system which uses injected air to remove volatile contaminants from saturated or groundwater regions of the soil's subsurface.

2. Description of the Prior Art

Air sparging is a relatively recent and a very innovative technology that uses air injected under pressure to remove environmentally harmful volatile contaminants. Air sparging systems are capable of removing volatile contaminants such as gasoline, certain solvents and jet fuels from the groundwater region of the soil subsurface. In particular, air sparging systems are used to remove residual source contamination, clean up dissolved phase contamination, and contain a migrating contaminant plume.

U.S. Pat. No. 6,305,378 for an "Adjustable Depth Air Spargimg Well" discloses a flow through packer which is slidably mounted within a well casing allowing for vertical movement of the flow through packer within the well casing. The flow through packer includes an inflatable packer fabricated from inflatable elastomeric tubing, a lower end portion of an air supply tube which has a plurality of openings for providing pressurized air to inflate the packer, and a pair of elastomer/rubber packer end caps. An air compressor is coupled to the air supply tube supplying pressurized air to the inflatable packer which inflates the packer holding the packer at a fixed depth within the well casing. Deflating the inflatable packer allows for vertical movement of the inflatable packer within the well casing. Positioned at the lower end of the air supply tube is a check valve and screen pressure regulator through which air under pressure passes to a well screen. The well screen, which comprises the lower portion of the well casing, is mounted in the soil's saturated zone. The pressurized air next passes through the well screen into the soil's saturation zone removing volatile contaminants and transferring the contaminants to the soil's vadoze zone.

There is a need, however, for a second point of air injection, preferably at a fixed depth to provide additional air flow channels resulting in the removal of all volatile contaminants from the saturated or ground water regions of the soil subsurface being treated.

SUMMARY OF THE INVENTION

The dual point adjustable depth air sparging well system comprising the present invention provides for an adjustable point of air injection and a second stationary point of air injection to remove all volatile contaminants from the saturated or ground water regions of the soil subsurface being treated.

The dual point adjustable depth air sparging well system requires a source, preferably an air compressor, of pressurized air to supply the air sparging well system for full functionality. A flexible air supply connects the source to an adjustable depth flow-through packer providing pressurized air to the flow-through packer. The flow-through packer includes a check valve and screen pressure regulator through which the air under pressure passes to a well screen. This combination forms a first point of air injection.

An annular air supply line also connected to the air compressor supplies air under pressure to a second point of air injection, which is located at a fixed depth above an air sparge packer for the flow-through packer.

The air compressor supplies pressurized air via the flow-through packer flexible air supply line and an annular air supply line to a well head air supply manifold positioned at the upper end of the well casing for dual point adjustable depth air sparging well. The manifold is pneumatically sealed using a compression fitting containing a rubber o-ring. The compression fitting prevents pressurized air from escaping into the atmosphere through the well head. In addition, the compression fitting seal serves the purpose of mechanically locking the flow-through packer in place at a pre-selected depth chosen by operator. This prevents vertical movement of the flow-through packer when the air sparging well system is operational.

The air traveling through the flow-through packer inflates the packer, sealing it against the well casing's internal wall and preventing the injected air from flowing back up the interior of the well casing.

The flow through air sparge packer is designed to have multiple lengths and is available in one foot sections, two and one half foot sections and five foot sections. In addition, multiple air sparge packers can be connected to one another.

A well screen, which comprises the lower portion of the well casing, is mounted in the soil's saturated zone. Pressurized air passes through the air sparge packer and then through a check valve and screened pressure regulator within the well screen into the soil's saturation zone at a primary injection point removing volatile contaminants and transferring the contaminants to the soil's vadoze zone. The check valve and screened pressure regulator is connected to the lower end of the air sparge packer.

Air supplied to the well head manifold flows through the space between an air supply tube, which is connected to the flow-through packer, and an internal surface of the wall casing. The air exits the top portion of the well screen above the inflated flow-through packer at a secondary injection point.

DETAILED DESCRIPTION OF THE PREFERRED EMBODIMENTS

Figure 1:
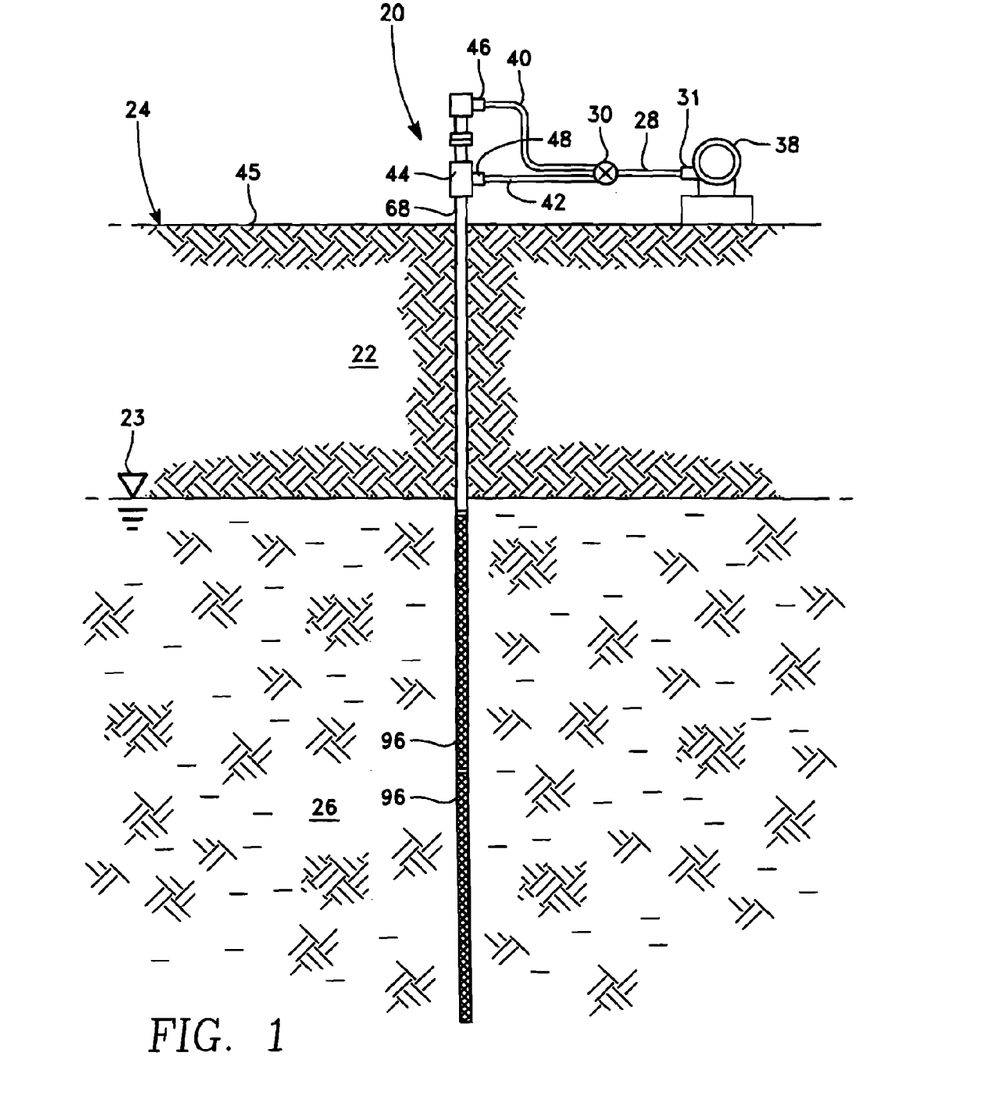
FIG. 1 illustrates a dual point adjustable depth air sparging well system which has a well head manifold allowing for a sealed secondary stream of air to be injected through the upper portion of the well system.
Figure 2:
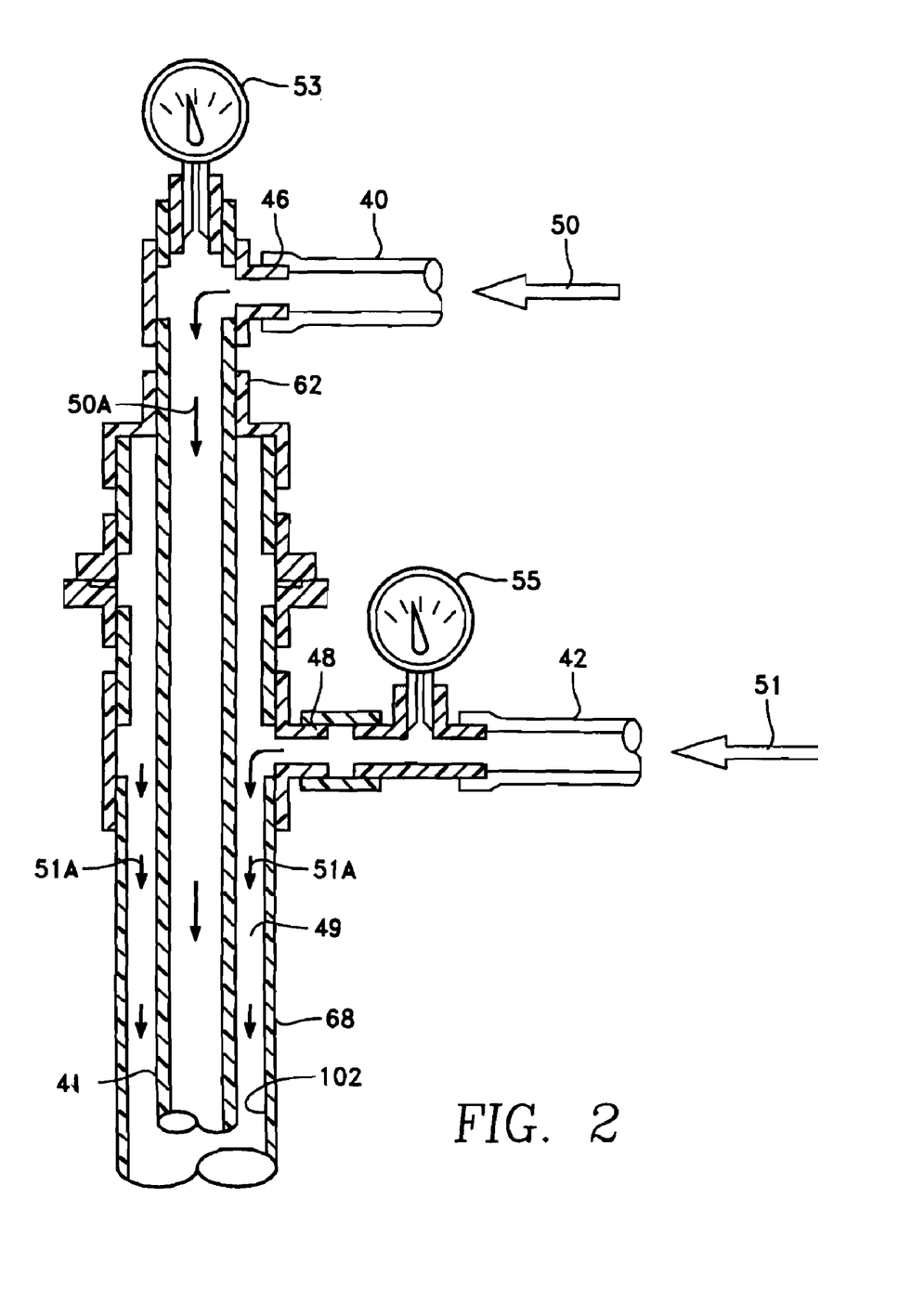
FIG. 2 illustrates a view in section of the upper portion of the dual point adjustable depth air sparging well system of FIG. 1 including a typical air flow pattern within the upper portion of the well system of FIG. 1.

Referring to FIGS. 1 and 2, FIG. 2 illustrates a preferred embodiment of the dual point adjustable depth air sparging well system 20 comprising the present invention. The dual point adjustable depth air sparging well system 20 removes volatile contaminants from the saturated or groundwater regions of the soil subsurface. The dual point adjustable depth air sparging well 20 is vertically positioned in the manner illustrated in FIG. 1 and passes through the vadoze zone 22 of the soil 24 into the saturated zone 26 of the soil 24. It should be noted that the saturated zone 26 of the soil 24 is homogeneous except for the confining soil lense. Boundary line or water table 23 indicates where in the soil the boundary between vadoze zone 22 and saturated zone 26 occurs.

An air blower 38 supplies pressurized air via a flexible air supply line 40 and an annular air supply line 42 to a well head air supply manifold 44 positioned at the upper end of the well casing 68 for dual point adjustable depth air sparging well 20. An air compressor may be used as air blower 38.

As shown in FIG. 1 a air supply line 28 and a two way air supply connector 30 connects the air supply port 31 of air blower 38 to flexible air supply line 40 and annular air supply line 42 to provide two sources of compressed air to dual point adjustable depth air sparging well system 20.

As shown in FIG. 1, well head sir supply manifold 44 has two air inlet ports 46 and 48. Air inlet port 46 is connected to flexible air supply line 40 and air inlet port 48 is connected to annular air supply line 42.

Figure 3:
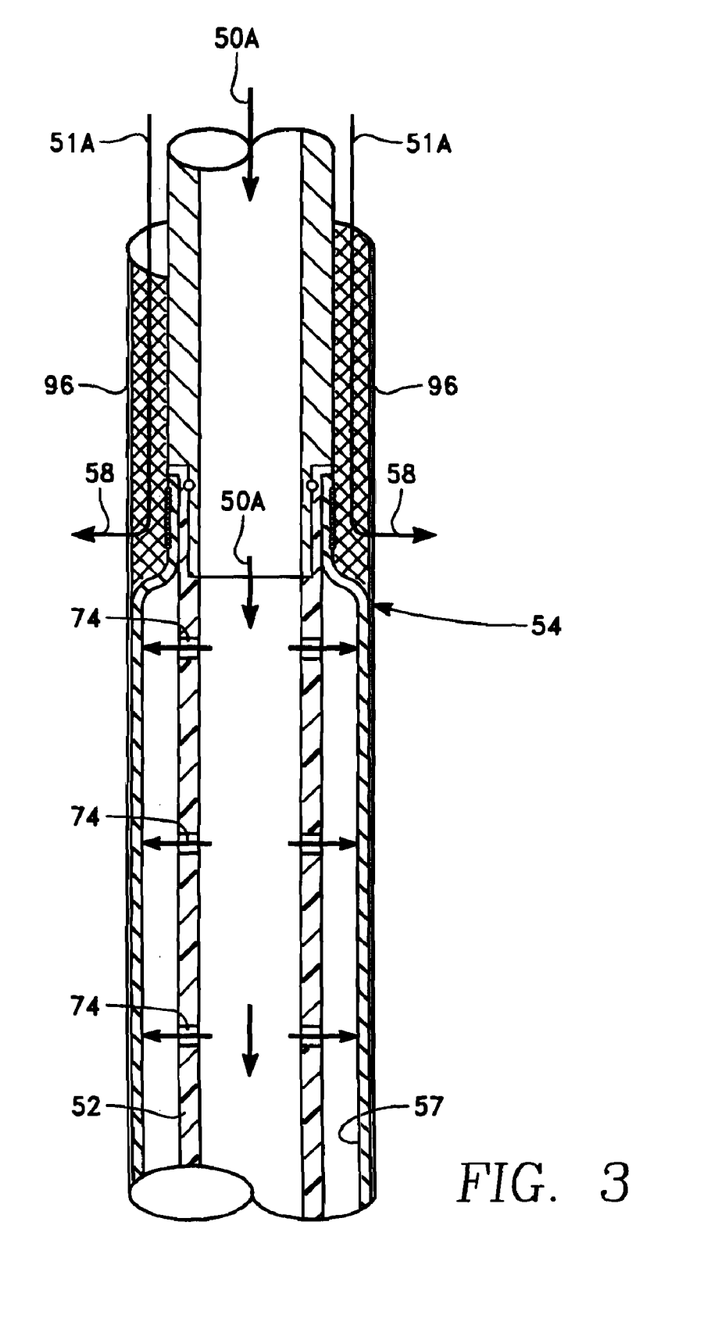
FIG. 3 is a detailed view in section illustrating the flow through air sparge packer for the dual point adjustable depth air sparging well of FIG. 1.

Referring to FIGS. 2 and 3, the packer air stream represented by arrows 50 is supplied to an flow-through air sparge packer 54 and a well screen 96.

The annular air stream represented by arrows 51 is supplied to a stationary secondary air injection point 58 (FIG. 3). Blower 38 is capable of supplying pressurized air at flow rates of between 5 scfm and 40 scfm to flow-through air sparge packer 54 and well screen 96 which is that portion of a well casing 68 extending into the soil's saturated zone 26. As shown in FIG. 1 the well screen 96 extends downward in the saturated zone 26 of the soil 24 from slightly below the water line 23 to the lower portion of the saturated zone 26 of the soil 24.

Blower 38 is also capable of supplying pressurized air at flow rates of between 5 scfm and 40 scfm to secondary air injection point 58 (FIG. 3) which is located slightly above flow-through air sparge packer 54. The compressed air passes through the well screen 96 at the injection point 58 in the manner illustrated in FIG. 3.

An air pressure gauge 53 monitors air flow through flexible air supply line 40. An air pressure gauge 55 monitors air flow through annular air supply line 42. Air pressure gauges 53 and 55 may be any commercially available air pressure gauge.

Located at the upper end of dual point adjustable depth air sparging well system 20 is a compression fitting seal and packer lock mechanism 62. Compression fitting seal and packer lock mechanism 62, which contains a rubber O-ring, secures the flexible air supply tube 40 to the air inlet port 46 of air sparging well system 20. The compression fitting prevents leakage of compressed air into the atmosphere through the well head. In addition, the compression fitting seal and packer lock mechanism 62 allows a user of air sparging well system 20 to mechanically lock the flow-through air sparge packer 54 in place at a pre-selected depth within the saturated zone 26, which is chosen by the user. This prevents vertical movement of the flow-through air sparge packer 54 when the air sparging well system is operational.

Referring to FIGS. 1, 2, 3, and 4 flow-through air sparge packer 54 is slidably mounted or positioned within well casing 68 allowing for vertical movement by the user of flow-through air sparge packer 54 within well casing 68. As shown in FIG. 1 well casing 68 extends from the soil's surface 45 through the vadoze zone 22 into the saturated zone 26 from which volatile contaminants are to be removed. A substantial portion of the well casing 68 extending into the saturated zone 26 is fully screened (as represented by the reference numeral 96). This allows for multiple primary injection points, which are represented by arrows 94 (FIG. 4) at different depths in the saturated zone 26 of the soil 24 with positioning of the flow-through air sparge packer 54 within the well screen 96 of the well casing 68 determining the actual depth at which primary air injection (as represented by arrows 94) occurs.

Figure 4:
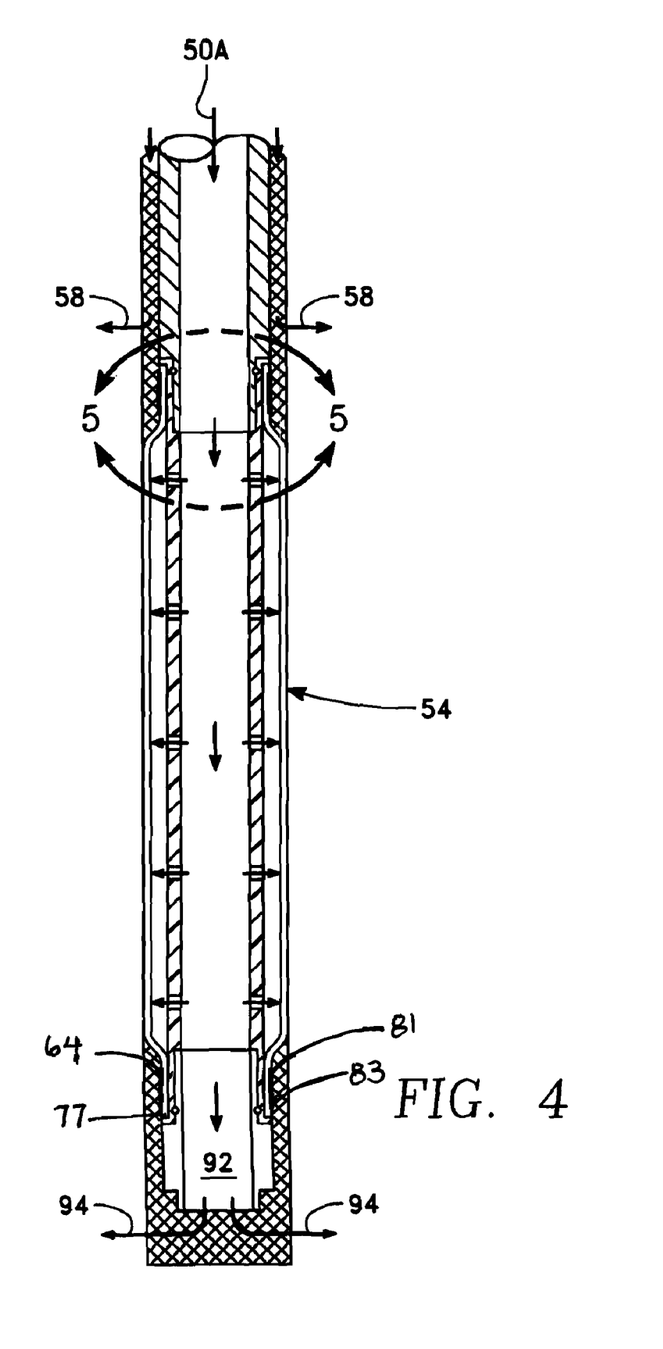
FIG. 4 is a detailed view in section illustrating air flow from the adjustable depth air sparging well system at a first preselected depth above an air sparge packer and a second preselected depth below the air sparge packer.

Referring to FIGS. 2, 3 and 4, compressed air flows through the flexible air supply line 40 in the manner represented by arrows 50 and 50A. The compressed air flows from the air blower 38 through flexible air supply line 40 and then through the flow-through air sparge packer 54 exiting the well screen 96 at the primary injection point 94 into the saturated zone 26 of the soil 24.

Pressurized air supplied to the well head manifold 44 via blower 38 and annular air supply line 42 flows from inlet port 48 through the space or passage way 49 located between the air supply tube riser 41, and an internal surface 102 of the well casing 68. Arrows 51A depict the air flow pattern through passage way 49 to the injection point. The pressurized air exits the top portion of the well screen 96 above the inflated flow-through air sparge packer 54 in the manner depicted by the secondary injection point arrows 58.

Figure 5:
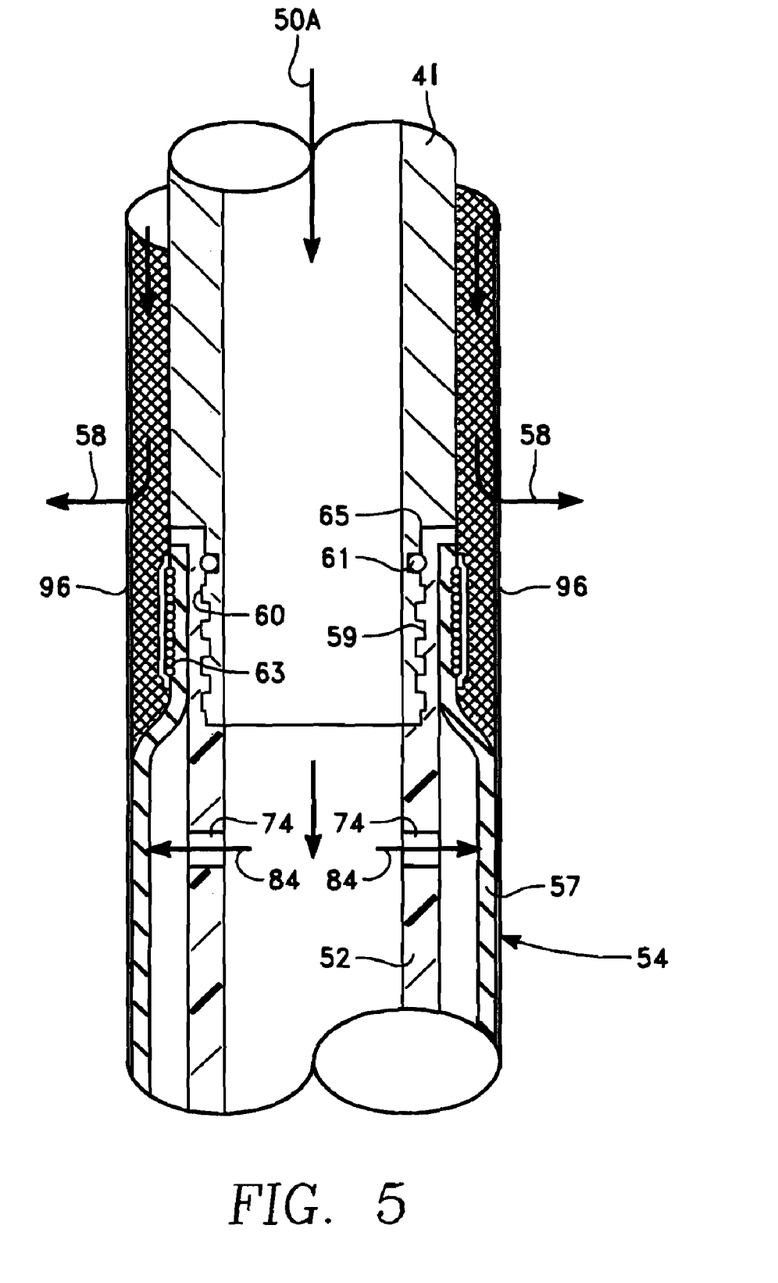
FIG. 5 illustrates a detailed view in section of a first embodiment of the flow through air sparge packer of FIG. 3.

Referring to FIGS. 4 and 5, FIG. 5 illustrates an embodiment of the flow-through air sparge packer 54 comprising an inflatable packer 57 fabricated from an inflatable elastomeric tubing, and a centrally located packer air supply tube 52 within the interior of flow-through air sparge packer 54. Packer air supply tube 52 has a plurality of openings 74 through which compressed air passes to inflate the inflatable packer 57.

When air under pressure passes through openings 74 (in the manner indicated by arrows 84) the outer surface of inflatable packer 57 presses against the inner surface of the well screen 96 of the well casing 68 which holds adjustable depth flow-through air sparge packer 54 in a fixed position within the well casing 68. When inflatable packer 57 is not under pressure, inflatable packer 57 deflates which allows for vertical movement of flow-through air sparge packer 54 within the well screen 96 of well casing 68. When inflatable packer 57 is inflated (in the manner shown in FIG. 5) a seal is formed which causes the compressed air to exit well screen 96 of the well casing at the secondary injection point (represented by arrows 58). This also prevents injected air from reentering the well screen 96 of the well casing 68 and subsequently short circuiting air flow through the contaminated regions of the soil's saturation zone 26.

One end of the packer air supply tube 52 of flow-through air sparge packer 54 is threaded and the opposite end includes grooves 59 (shown in FIG. 5). Grooves 59 within packer air supply tube 52 allow the user to secure the air supply tube riser 41 which is threaded (the threads for air supply tube riser 41 are represented by reference numeral 60) to the packer air supply line 52. A rubber O-ring 61 is also included at each end of packer air supply 52 to prevent air leakage The rubber O-ring 61 at the upper end of the flow-through air sparge packer 54 provides a seal between the flexible air supply line 40 and the flow-through air sparge packer 54 which prevents leakage of compressed air.

Steel wire 63 wound around the exterior of the inflatable packer 57 at each end of the flow-through air sparge packer 54 secures the inflatable packer 57 to an associated end of the packer air supply tube 52. An elastomeric cover 65 positioned over the wound wire 63 covers the wire 63.

Figure 6:
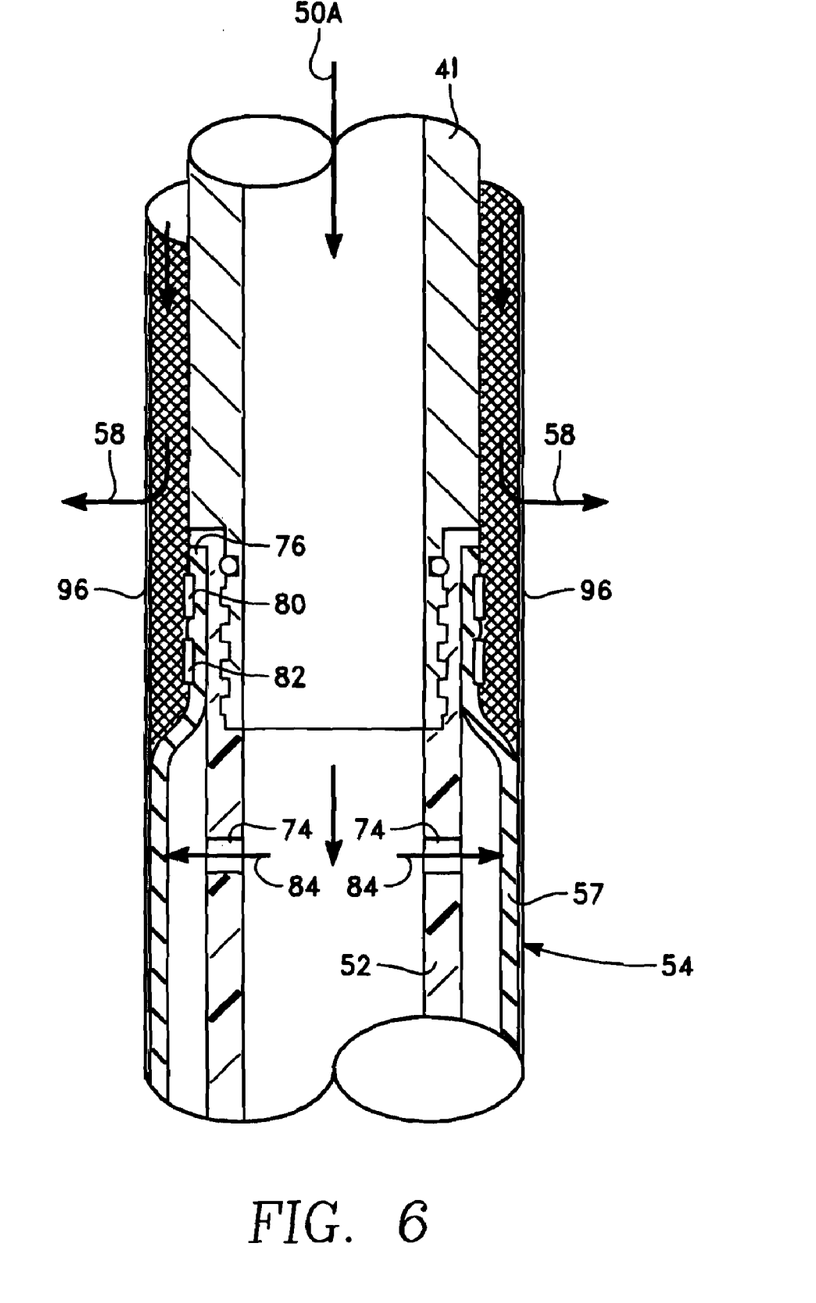
FIG. 6 illustrates a detailed view in section of a first embodiment of the flow through air sparge packer of FIG. 3.

Referring to FIGS. 4 and 6, FIG. 6 illustrates a second embodiment of the flow-through air sparge packer 54 comprising an inflatable packer 57 fabricated from an inflatable elastomeric tubing, and a centrally located packer air supply tube 52 within the interior of flow-through air sparge packer 54. Packer air supply tube 52 has a plurality of openings 74 through which compressed air passes to inflate the inflatable packer 57.

When air under pressure passes through openings 74 (in the manner indicated by arrows 84) the outer surface of inflatable packer 57 presses against the inner surface of the well screen 96 of the well casing 68 which holds adjustable depth flow-through air sparge packer 54 in a fixed position within the well casing 68.

Referring to FIG. 6 an elastomeric packer end section 76 located at the upper end of flow-through air sparge packer 54 secures the inflatable packer 57 to the upper end of the packer air supply tube 52. There is an identical packer end section located at the bottom end of the packer air supply tube 52, which secures the inflatable packer 57 to the lower end of the packer air supply tube 52. A pair of stainless steel strappings 80 and 82 are used to secure the upper end portion 76 of the inflatable packer 57 to packer air supply tube 52. A second pair of stainless steel strappings are used to secure the lower end portion of the inflatable packer 57 to packer air supply tube 52.

In the preferred embodiment the flow-through air sparge packer 54 has multiple lengths of one foot, two and one half feet and five feet. This allows the user to adjust the depth of the primary injection point (represented by arrows 94, FIG. 4) by selecting for use the flow-through air sparge packer 54 having a length which corresponds to the depth below the soil's vadoze zone 22 at which the primary injection point is be located.

It should be understood that the flow-through air sparge packer 54 can be designed to meet user requirements. For example, if the user needs a four foot length or a six foot length air sparge, the unique design of the flow-through air sparge packer 54 allows for these lengths.

Since one end of each flow-through air sparge packer 54 is threaded and the opposite end is grooved, multiple flow-through air sparge packers 54 can be secured to one another to extend the depth at which the primary injection point is located within the soil's saturated zone 26. If it is desired to have the primary injection point at a depth of approximately ten feet within the soil's saturated zone 26 two flow-through air sparge packers 54 having five foot lengths are connected to one another. For a depth of approximately fifteen feet within the soil's saturated zone 26, the primary injection point is located within the soil's saturation zone 26 by securing three five foot length flow-through air sparge packers 54 together. For a depth of approximately twelve feet, the primary injection point is located within the soil's saturation zone 26 by securing three five foot length and two one foot length flow-through air sparge packers 54 together.

With lengths of the air sparge packer being available for use in one foot increments, the user can locate the primary injection point at any depth within the soil's saturation zone 26 the user desires.

At this time it should be noted that packer air supply tube 52 has an outside diameter of approximately 0.5-1.0 inches, while well casing 68 has an inside diameter of approximately 1.0-2.5 inches.

Referring to the lower end of packer air supply tube 52 is a check valve and screened pressure regulator 92. The check valve and screened pressure regulator 92 has its pressure regulator screen fitted to the regulator's exit port to prevent sediment from entering the flow-through air sparge packer 54. Air under pressure 25 passes the one valve 92 in the manner indicated by arrows 94. The pressurized air next passes through well screen 96 (also depicted by arrows 94) into the soil's saturated zone 26.

As the elastomeric tubing inflates, pressure within inflatable packer 57 will rise until pore and hydrostatic pressures associated with the injection depth of adjustable depth air sparging well 20 are overcome. Once these pressures are overcome, pressurized air flows out the check valve and screened pressure regulator 92 of inflatable packer 57 through well screen 96 into the contaminated aquifer or saturated zone 26. Air flow within saturated zone 26 is depicted in FIG. 1 as being through air channels 98. Pressurized air which passes through the well screen 96 into the soil's saturation zone 22 removes volatile contaminants from saturation zone 26 and transfers the contaminants to the soil's vadoze zone 22.

Referring to FIGS. 1 and 4, FIG. 4 illustrates an air flow pattern of sparged air as it exits both the stationary or secondary injection point 58 and the adjustable or primary injection points 94. The stationary injection point 58 is typically positioned at a shallow depth to allow the user to place one or more adjustable depth flow-through air sparge packer 54 at a greater range of injection depths within the soil's saturation zone 26. Injecting compressed air in the soil at a shallow depth results in the generation of air flow channels within the soil 24. This secondary injection point has the advantage of stripping a significant portion of volatile Nonaqueous phase contaminants from the saturated region 26 that tend to reside at or just below the water table. Applying two points of injection, i.e. primary injection point 94 and the secondary injection point 58 through a single air sparging well system 20 significantly improves the overall cleanup process and the speed at which it occurs.

From the foregoing, it is readily apparent that the present invention comprises a new, unique, and exceedingly useful dual point adjustable depth air sparging well for removing volatile contaminants from saturated and groundwater regions of the soil which constitutes a considerable improvement over commercially available air sparging system which do not allow for depth adjustment of the system.

What is claimed is:

1. An adjustable depth air sparging system for removing volatile contaminants from a saturated zone within a soil subsurface comprising:
    (a) a vertically oriented well casing extending downward into the saturated zone within the soil subsurface, said well casing having a screened portion at a lower end thereof positioned within said saturated zone;
    (b) an air supply tube riser centrally located within an interior of said well casing, said air supply tube riser extending downward through said well casing into an upper end portion of the screened portion of said well casing;
    (c) a flexible air supply line supplying pressurized air to said air supply tube riser;
    (d) an annular air supply line supplying the pressurized air to a space between said air supply tube riser and said well casing, said flexible air supply line and annular air supply line injecting the pressurized air into different sections said well casing at the same time;

(e) air supply means connected to said flexible air supply line for providing the pressurized air to said air supply tube riser;

(f) a flow-through air sparge packer positioned within the screened portion of said well casing, said flow-through air sparge packer having an packer air supply tube centrally located therein, said packer air supply tube having an upper end connected to said air supply tube riser, a lower end and a plurality of openings;

(g) said flow-through air sparge packer having an elastomeric material which extends from the upper end of said packer air supply tube to the lower end of said packer air supply tube and covers the openings within said packer air supply tube forming an air tight seal around said packer air supply tube;

(h) adjustable depth injecting means affixed to the lower end of said packer air supply tube of said flow-through air sparge packer to receive said pressurized air, said adjustable depth injecting means injecting said pressurized air through the screened portion of said well casing below said air sparge packer into the saturated zone of said soil subsurface at a plurality of selected depths, forming air channels at each of said selected depths through which said pressurized air flows to remove said volatile contaminants from said saturated zone, wherein said flow-through air sparge packer having a length selected from a plurality of lengths which allows a user to select one of said plurality of lengths of said flow-through air sparge packer to use within said adjustable depth air sparging system for positioning said adjustable depth injecting means within said well screen at each of said selected depths;

(i) locking means for locking said adjustable depth injecting means in a fixed position at each of said selected depths to prevent vertical movement of said adjustable depth injecting means when said air sparging system is operational; and (j) said upper end portion of the screen portion of said well casing receiving said pressurized air from said flexible air supply line and then injecting said pressurized air through the screened portion of said well casing above said air sparge packer into said saturated zone forming additional air channels through which said pressurized air flows to remove said volatile contaminants from said saturated zone.

2. The adjustable depth air sparging system of claim 1 wherein said air supply means comprises an air blower.

3. The adjustable depth air sparging of claim 1 wherein said adjustable depth injecting means comprises a check valve and screened pressure regulator through which said pressurized air passes to the screened portion of said well casing.

4. The adjustable depth air sparging system of claim 1 wherein said flow-through air sparge packer is inflatable, said flow-through air sparge packer when inflated by said pressurized air passing through said plurality of openings within said packer air supply tube holding said adjustable depth injecting means in said fixed position at each of said plurality of selected depths to prevent the vertical movement of said adjustable depth injecting means when said air sparging system is operational.

5. The adjustable depth air sparging system of claim 1 wherein the elastomeric material of said flow-through air sparge packer is an inflatable rubber or elastomeric tubing.

6. The adjustable depth air sparging system of claim 1 wherein said elastomeric material for said flow-through air sparge packer includes:

(a) first and second end sections, said first end section being located at an upper end of said elastomeric material and said second end section being located at a lower end of said elastomeric material, said first and second end sections being adapted to secure said elastomeric material to said packer air supply tube;

(b) first and second stainless steel strappings mounted on said first end section, said first and second stainless steel strappings when tightened securing said first end section to said packer air supply tube; and (c) third and fourth stainless steel strappings mounted on said second end section, said third and fourth stainless steel strapping when tightened securing said second end section to said packer air supply tube.

7. The adjustable depth air sparging system of claim 1 wherein said elastomeric material for said flow-through air sparge packer includes a first bundle of wire wound around an upper end of said elastomeric material and a second bundle of wire wound around a lower of said elastomeric material to secure said elastomeric material to said packer air supply tube and form said air tight seal of said elastomeric material around said packer air supply tube.

8. The adjustable depth air sparging system of claim 1 wherein said plurality of lengths for said flow-through air sparge packer include one foot, two and one half foot and five foot lengths for said flow-through air sparge packer.

9. An adjustable depth air sparging system for removing volatile contaminants from a saturated zone within a soil subsurface comprising:

(a) a vertically oriented well casing extending downward into the saturated zone within the soil subsurface, said well casing having a solid portion at an upper end thereof and a screened portion at a lower end thereof positioned within said saturated zone;

(b) an air supply tube riser centrally located within an interior of said well casing, said air supply tube riser extending downward through said well casing into an upper end portion of the screened portion of said well casing;

(c) a flexible air supply line supplying pressurized air to said air supply tube riser;

(d) an annular air supply line supplying the pressurized air to a space between said air supply tube riser and said well casing, said flexible air supply line and annular air supply line injecting air into different sections said well casing at the same time;

(e) an air blower having an air supply port connected to said flexible air supply line for providing the pressurized air to said air supply tube riser;

(f) a plurality of flow-through air sparge packers positioned within the screened portion of said well casing, said plurality of flow-through air sparge packers being connected to one another within the screened portion of said well casing, each of said plurality of flow-through air sparge packers having said packer air supply tube centrally located therein, wherein the packer air supply tube of a highest positioned one of said flow-through air sparge packers within a well screen has an upper end connected to said air supply tube riser, and the packer air supply tube of a remainder of said flow-through air sparge packers has a lower end connected to the upper end of the packer air supply tube of another of said flow-through air sparge packers;

(g) each of said flow-through air sparge packers having an elastomeric material which extends from the upper end of said packer air supply tube to the lower end of said packer air supply tube and covers a plurality of openings within said packer air supply tube forming an air tight seal around said packer air supply tube;

(h) adjustable depth injecting means affixed to the lower end of the packer air supply tube of a lowest positioned one of said flow-through air sparge packers within said well screen to receive said pressurized air, said adjustable depth injecting means injecting said pressurized air through the screened portion of said well casing below the lowest positioned one of said flow-through air sparge packers into the saturated zone of said soil subsurface at a plurality of selected depths, forming air channels at each of said selected depths through which said pressurized air flows to remove said volatile contaminants from said saturated zone, wherein said flow-through air sparge packers have a length selected from a plurality of lengths which allows a user to select one of said plurality of lengths for each of said flow-through air sparge packers to use within said adjustable depth air sparging system for positioning said adjustable depth injecting means within said well screen at each of said selected depths;

(i) locking means for locking said adjustable depth injecting means in a fixed position at each of said selected depths to prevent vertical movement of said adjustable depth injecting means when said air sparging system is operational; and (j) upper end portion of the screen portion of said well casing receiving said pressurized air from said flexible air supply line and then injecting said pressurized air through the screened portion of said well casing above the highest positioned one of said flow-through air sparge packers into said saturated zone forming additional air channels through which said pressurized air flows to remove said volatile contaminants from said saturated zone.

10. The adjustable depth air sparging system of claim 9 wherein said adjustable depth injecting means comprises a check valve and screened pressure regulator through which said pressurized air passes to the screened portion of said well casing.

11. The adjustable depth air sparging system of claim 9 wherein each of said flow-through air sparge packers is inflatable, and each of said flow-through air sparge packers when inflated by said pressurized air passing through said plurality of openings within each of said flow-through air sparge packers holding said adjustable depth injecting means in said fixed position at each of said plurality of selected depths to prevent the vertical movement of said adjustable depth injecting means when said air sparging system is operational.

12. The adjustable depth air sparging system of claim 9 wherein the elastomeric material of each of said flow-through air sparge packers is an inflatable rubber or elastomeric tubing.

13. The adjustable depth air sparging system of claim 9 wherein said elastomeric material for each of said flow-through air sparge packer includes:

(a) first and second end sections, said first end section being located at an upper end of said elastomeric material and said second end section being located at a lower end of said elastomeric material, said first and second end sections being adapted to secure said elastomeric material to said packer air supply tube for each of said flow-through air sparge packers;

(b) first and second stainless steel strappings mounted on said first end section, said first and second stainless steel strappings when tightened securing said first end section to said packer air supply tube for each of said flow-through air sparge packers; and (c) third and fourth stainless steel strappings mounted on said second end section, said third and fourth stainless steel strapping when tightened securing said second end section to said packer air supply tube for each of said flow-through air sparge packers.

14. The adjustable depth air sparging system of claim 9 wherein said elastomeric material for said flow-through air sparge packer includes a first bundle of wire wound around an upper end of said elastomeric material and a second bundle of wire wound around a lower end of said elastomeric material for each of said flow-through air sparge packers to secure said elastomeric material to said packer air supply tube and form said air tight seal of said elastomeric material around said packer air supply tube for each of said flow-through packers.

15. The adjustable depth air sparging system of claim 9 wherein said plurality of lengths for said air sparge packer include one foot, two and one half foot and five foot lengths for said air sparge packer.

16. An adjustable depth air sparging system for removing volatile contaminants from a saturated zone within a soil subsurface comprising:

(a) a vertically oriented well casing extending downward into the saturated zone within the soil subsurface, said well casing having a solid portion at an upper end thereof and a screened portion at a lower end thereof positioned within said saturated zone;

(b) an air supply tube riser centrally located within an interior of said well casing, said air supply tube riser extending downward through said well casing into an upper end portion of the screened portion of said well casing;

(c) a flexible air supply line supplying pressurized air to said air supply tube riser;

(d) an annular air supply line supplying pressurized air to a space between said air supply tube riser and said well casing, said flexible air supply line and annular air supply line injecting the air into different sections said well casing at the same time;

(e) an air blower having an air supply port connected to said flexible air supply line for providing the pressurized air to said air supply tube riser;

(f) a plurality of flow-through air sparge packers positioned within the screened portion of said well casing, said plurality of flow-through air sparge packers being connected to one another within the screened portion of said well casing, each of said plurality of flow-through air sparge packers having a packer air supply tube centrally located therein, wherein the packer air supply tube of a highest positioned one of said flow-through air sparge packers within said well screen has an upper end connected to said air supply tube riser, and the packer air supply tubes of a remainder of said flow-through air sparge packers has a lower end connected to the upper end of the packer air supply tube of another of said flow-through air sparge packers;

(g) each of said flow-through air sparge packers having an elastomeric material which extends from the upper end of said packer air supply tube to the lower end of said packer air supply tube and covers a plurality of openings within said packer air supply tube forming an air tight seal around said packer air supply tube;

(h) a check valve and screened pressure regulator affixed to the lower end of the packer air supply tube of a lowest positioned one of said flow-through air sparge packers within said well screen to receive said pressurized air, said check valve and screened pressure regulator injecting said pressurized air through the screened portion of said well casing below the lowest positioned one of said flow-through air sparge packers into the saturated zone of said soil subsurface at a plurality of selected depths, forming air channels at each of said selected depths through which said pressurized air flows to remove said volatile contaminants from said saturated zone, wherein said flow-through air sparge packers have a length selected from a plurality of lengths which allows a user to select one of said plurality of lengths for each of said flow-through air sparge packers to use within said adjustable depth air sparging system for positioning said check valve and screened pressure regulator within said well screen at each of said selected depths;

(i) a compression fitting seal and packer lock mechanism for locking said check valve and screened pressure regulator in a fixed position at each of said selected depths to prevent vertical movement of said check valve and screened pressure regulator when said air sparging system is operational; and said well casing receiving said pressurized air from said flexible air supply line and then injecting said pressurized air through the upper end portion of the screen portion of said well casing above the highest positioned one of said flow-through air sparge packers into said saturated zone forming additional air channels through which said pressurized air flows to remove said volatile contaminants from said saturated zone.

17. The adjustable depth air sparging system of claim 16 wherein each of said flow-through air sparge packers is inflatable, and each of said flow-through air sparge packers when inflated by said pressurized air passing through said plurality of openings within each of said flow-through air sparge packers holding said adjustable depth injecting means in said fixed position at each of said plurality of selected depths to prevent the vertical movement of said adjustable depth injecting means when said air sparging system is operational.

18. The adjustable depth air sparging system of claim 16 wherein said elastomeric material for each of said flow-through air sparge packer includes:
  (a) first and second end sections, said first end section being located at an upper end of said elastomeric material and said second end section being located at a lower end of said elastomeric material, said first and second end sections being adapted to secure said elastomeric material to said packer air supply tube for each of said flow-through air sparge packers;
  (b) first and second stainless steel strappings mounted on said first end section, said first and second stainless steel strappings when tightened securing said first end section to said packer air supply tube for each of said flow-through air sparge packers; and
  (c) third and fourth stainless steel strappings mounted on said second end section, said third and fourth stainless steel strapping when tightened securing said second end section to said packer air supply tube for each of said flow-through air sparge packers.

19. The adjustable depth air sparging system of claim 16 wherein said elastomeric material for said flow-through air sparge packer includes a first bundle of wire wound around an upper end of said elastomeric material and a second bundle of wire wound around a lower of said elastomeric material for each of said flow-through air sparge packers to secure said elastomeric material to said packer air supply tube and form said air tight seal of said elastomeric material around said packer air supply tube for each of said flow-through air sparge packers.

20. The adjustable depth air sparging system of claim 16 wherein said plurality of lengths for said flow-through air sparge packer include one foot, two and one half foot and five foot lengths for said flow-through air sparge packer.

\* \* \* \* \*